Feb. 7, 1928.
1,658,362
R. G. WALKER
PROCESS FOR PURIFYING CONTINUOUSLY CIRCULATING MACHINERY LUBRICATING OILS
Filed Feb. 4, 1926
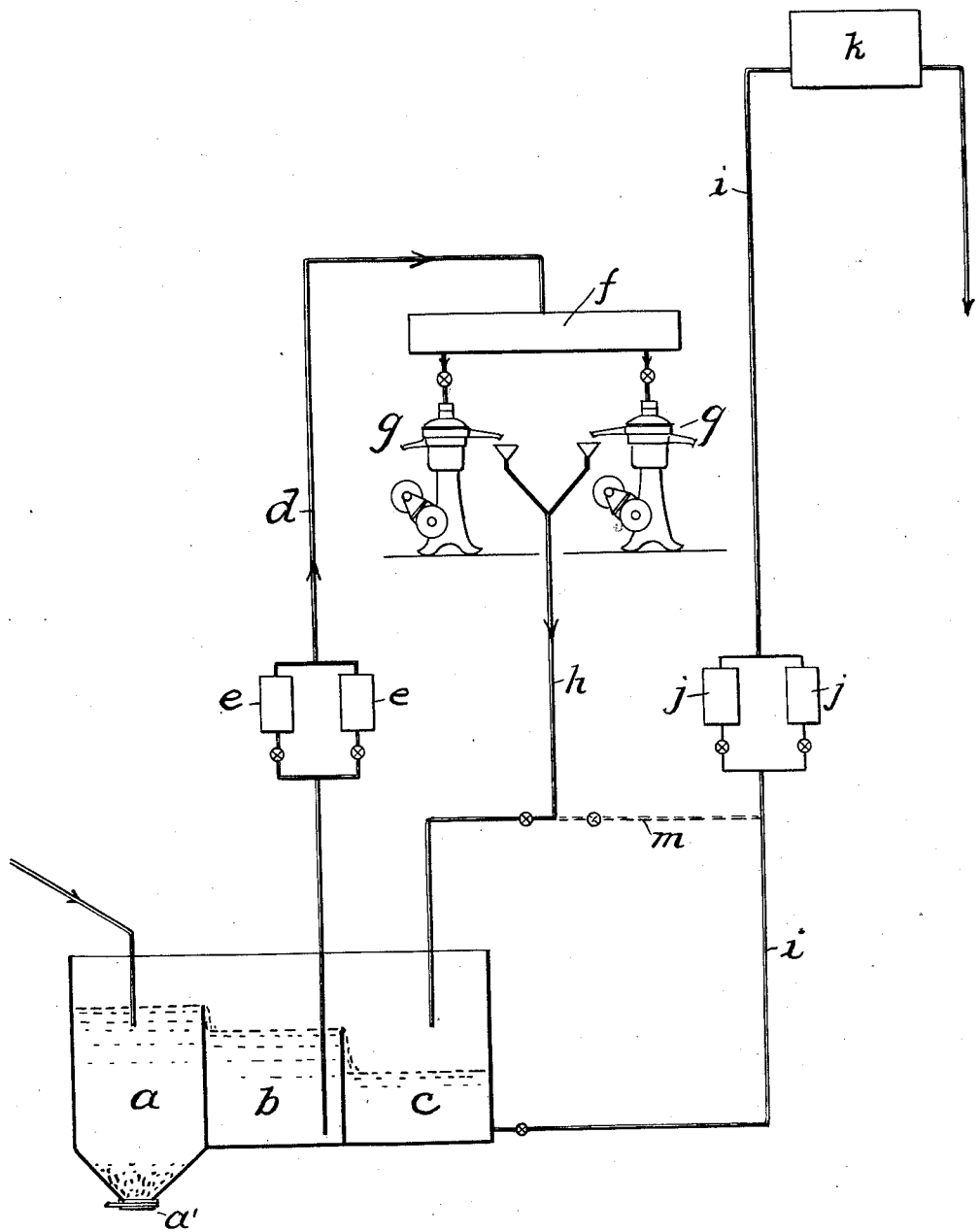
WITNESS:
INVENTOR
Robert G. Walker
BY
ATTORNEYS Patented Feb. 7, 1928.

1,658,362

UNITED STATES PATENT OFFICE.

ROBERT G. WALKER, OF NEW YORK, N. Y., ASSIGNOR TO THE DE LAVAL SEPARATOR COMPANY, OF NEW YORK, N. Y., A CORPORATION OF NEW JERSEY.

PROCESS FOR PURIFYING CONTINUOUSLY-CIRCULATING MACHINERY-LUBRICATING OILS.

Application filed February 4, 1926. Serial No. 85,867.

In certain machinery, as, for example, rolling mills and engines or motors for driving the same, it is necessary to pump oil, in an endless circuit, in substantial volume and at a substantial velocity, through the bearings of the machinery. In rolling mills, due to the heavy work performed by the rolls, the engine drive must be a direct one and the engine must be located in close proximity to the mills. Under the conditions existing in such a mill, the oil from the engine bearings, as well as the oil from the roll bearings and gears, becomes speedily and seriously contaminated, not only with dirt, dust and scale but also with metal and other materials of high specific gravity. Due to the great volume of oil that, in a given time, flows through the bearings, it is deemed impracticable to economically purify it in circuit. There is, of course, no time for gravity separation, while centrifugal separation would require an impracticably large number of centrifuges; and, moreover, a centrifuge is not adapted to remove certain of the heavier bulkier impurities which the oil picks up.

I have, however, developed a process for purifying the oil in circuit which is both efficient and economical. In my process, the more readily precipitable contaminating materials, and especially those materials of high specific gravity and considerable bulk which a centrifuge is least well adapted to remove, are preferably removed by gravity settlement as soon as possible after the oil leaves the bearings and before its subjection to further purification treatment. I have found that a minor degree of contamination does not militate against the effectiveness of the oil for lubricaing purposes, but that the impairment of lubricating efficiency is due to cumulative contamination arising from repeated travel of the oil through the circuit. I take the oil, as it comes from the bearings, and preferably after it is to a minor degree purified by gravity settlement, and by-pass a part of the oil through one or more centrifuges and mix the centrifugally purified oil with the oil in the main stream that is conducted back to the bearings. Thereby the degree of contamination of the oil is much reduced and it is put into condition that fits it for re-use.

Without other provisions, the tendency would be for the degree of contamination to increase with repeated circulation of the oil, although the oil would be efficient for lubricating purposes for a much longer time than with no provisions for purification. My process is adapted, however, to maintain the oil in a condition of substantial purity, and hence of lubricating efficiency, for an indefinite time, or at least as long as the mill may be maintained in continuous operation. To accomplish this result, I convey the oil from the bearings to a tank wherein the preliminary partial gravity purification occurs. From this tank, the oil is adapted to overflow into a second tank. Only the most readily precipitable contaminating materials will settle in this tank, because the oil is constantly being admitted thereto and is constantly overflowing therefrom, so that, unless the tank be made of impracticably large dimensions, there is considerable surging in the tank. This lack of quiescence is unfavorable to thorough gravity separation, even if such mode of separation would be effective to remove all the constituents of higher specific gravity than the oil. As heretofore stated, however, certain contaminating materials will settle therein, and among such materials are those the capacity to remove which by a centrifuge is more or less uncertain.

The oil that overflows into the second tank is skimmed from the top of the first tank so that there is no danger of the passage into the second tank of the most readily precipitable materials. In the second tank, the conditions of surging, or lack of quiescence, is present as in the first tank and due to this condition, and to the comparatively short time during which the oil is present in the tank, the tendency to gravity separation is not particularly strong. It is, however, very appreciable, and consequently, the oil to be centrifugally purified is taken preferably, from near the bottom, or from a lower zone, of the tank, so that there passes to the centrifuge the most heavily contaminated part of the oil that has passed into the second tank.

From the second tank, that oil that is not by-passed to the centrifuge overflows into a third tank. The oil flowing direct from the second tank to the third tank, being skimmed from the top of the second tank, is comparatively, although by no means absolutely, pure; but approximates, although it does not reach, the degree of purity required for re-use in the bearings. The oil that is by-passed to the centrifuge should be heated before admission to the centrifuge, as heating reduces the viscosity of the oil, thus facilitating the separation of contaminating constituents.

The oil from the centrifuge is passed to the third tank, where it is mixed with the less pure oil that has overflowed thereinto, thereby providing a mixed oil having the degree of purity required for lubrication.

By this process, the tendency of the oil to slowly become more and more contaminated by reason of only a fractional centrifugal purification thereof is nearly or quite counteracted; that is, centrifugal purification is constantly supplemented by some degree of gravity purification, while the fraction of the oil that, in any circuit of the oil, is subjected to centrifugal purification is the fraction that contains the largest percentage of impurities, so that the tendency to cumulative degeneration of the oil is almost completely neutralized.

The drawing is an elevational diagrammatic view of one form of purification plant adapted to carry out my process.

From the bearings of a rolling mill, rolling mill engine, or other machine, the oil is drained into a tank $a$. In this tank an initial and very partial settlement occurs, the constituents removed being largely those which a centrifuge is least well adapted to remove. Tank $a$ should be provided with a drain $a'$, normally closed, through which sediment may be withdrawn while the machinery is out of operation. From tank $a$, the oil overflows into a tank $b$. From this tank the oil is removed at the same rate at which it is supplied to the tank. A part of the oil is pumped, through a pipe line $d$, to a heater $f$, and thence to one or more centrifugal purifiers $g$. From these purifiers the purified oil flows, through a pipe line $h$, to a third tank $c$, which receives the overflow from tank $b$. If the oil should be pumped to the centrifuges as fast as it is admitted to tank $b$, there would be no overflow into tank $c$; but the handling of all the oil by centrifuges being impracticable and uneconomical, there is normally considerable overflow into tank $c$. The oil pumped to the centrifuges is taken, preferably, from near the bottom of tank $b$, and therefore the fraction that is centrifugally purified is the most heavily contaminated fraction. The mixed oil in tank $c$, which has a sufficiently high, although not a maximum, degree of purity, is pumped, through a pipe $i$, to a tank $k$, which should be provided with known means to prevent overflow. From tank $k$ the oil is continuously fed to the machines.

It is preferred to install two pumps $e, e$, in pipe line $d$, and two pumps $j, j$, in pipe line $i$. One pump of each pair may be used at a time; the other being a spare pump for use while the first pump is being cleaned.

It is preferred to use at least two centrifugal purifiers $g, g$. It is preferred, also, to use both of these centrifuges concurrently, although, for temporary purposes, one of them will suffice while the other is being cleaned. If desired, the oil from the centrifuges may be passed, through a pipe $m$, direct to tank $k$, or to the pipe $i$ leading thereto.

It is possible, for some purposes, to omit the tank $a$, and flow the oil from the machines direct into tank $b$. This is practicable if the oil contains no large, heavy particles that should not go to the centrifuge.

Having now fully described my invention, what I claim and desire to protect by Letters Patent is:

1. The process of continuously purifying contaminated oil which comprises substantially continuously flowing the contaminated oil into a body of such oil in which body the most readily precipitable contaminating constituents settle by gravity, substantially continuously withdrawing oil from which said heavy contaminating constituents have been separated from the upper part of said body of oil into another body of oil, substantially continuously withdrawing oil from the second body of oil to a locus of purification at a rate substantially less than the rate of inflow to said body, centrifugally purifying such withdrawn oil, maintaining a substantially constant volume of oil in said second body of oil by separately withdrawing from the upper part of said body oil, more completely purified than that received from the first body of oil but less completely purified than that from the locus of centrifugal purification, at such a rate that, with the oil withdrawn for centrifugal purification, outflows of oil from said second body of oil are established that balance the inflow thereto, and intermingling the less completely purified oil that is withdrawn from the second body of oil and the more completely centrifugally purified oil.

2. The process of continuously purifying contaminated oil which comprises substantially continuously flowing the contaminated oil into a body of such oil in which body the most readily precipitable contaminating constituents settle by gravity, substantially continuously withdrawing oil from which said heavy contaminating constituents have been separated from the upper part of said body of oil into another body of oil, substantially continuously withdrawing oil from the second body of oil to a locus of purification at a rate substantially less than the rate of inflow to said body, centrifugally purifying such withdrawn oil, maintaining a substantially constant volume of oil in said second body of oil by separately withdrawing from the upper part of said body oil, more completely purified than that received from the first body of oil but less completely purified than that from the locus of centrifugal purification, at such a rate that, with the oil withdrawn for centrifugal purification, outflows of oil from said second body of oil are established that balance the inflow thereto, conveying both streams of outflowing oil to a third body of oil and continuously removing oil from the third body of oil.

In testimony of which invention, I have hereunto set my hand, at New York city, on this 20th day of January, 1926.

ROBERT G. WALKER.